United States Patent
Sako et al.

(10) Patent No.: US 11,358,514 B2
(45) Date of Patent: Jun. 14, 2022

(54) MOBILE OBJECT AND STORAGE MEDIUM

(71) Applicant: SONY CORPORATION, Tokyo (JP)

(72) Inventors: Yoichiro Sako, Tokyo (JP); Hiroshi Okada, Kanagawa (JP); Kazuhiro Watanabe, Tokyo (JP); Kazuyuki Sakoda, Chiba (JP); Hirofumi Yuchi, Kanagawa (JP); Kohei Asada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/392,774

(22) Filed: Apr. 24, 2019

(65) Prior Publication Data

US 2019/0248270 A1 Aug. 15, 2019

Related U.S. Application Data

(63) Continuation of application No. 14/023,755, filed on Sep. 11, 2013, now Pat. No. 10,308,164.

(30) Foreign Application Priority Data

Sep. 21, 2012 (JP) ................................ 2012-208028

(51) Int. Cl.
*B60Q 1/00* (2006.01)
*B60Q 1/16* (2006.01)
(Continued)

(52) U.S. Cl.
CPC ......... *B60Q 1/0023* (2013.01); *B60Q 1/0017* (2013.01); *B60Q 1/04* (2013.01);
(Continued)

(58) Field of Classification Search
None
See application file for complete search history.

(56) References Cited

U.S. PATENT DOCUMENTS

2005/0140929 A1 6/2005 Nambudiri et al.
2006/0268233 A1 11/2006 Sato
(Continued)

FOREIGN PATENT DOCUMENTS

CN 1749849 A * 3/2006
CN 1749849 A 3/2006
(Continued)

OTHER PUBLICATIONS

CN 1749849 A, Machine Translation: (Year: 2006).*
(Continued)

*Primary Examiner* — Samuel D Fereja
(74) *Attorney, Agent, or Firm* — Chip Law Group

(57) ABSTRACT

There is provided a mobile object including an imaging unit configured to capture a perimeter of the mobile object, a speaker configured to be capable of controlling directivity, a determination unit configured to determine whether the mobile object is in a driving mode, and a speaker control unit configured to control the speaker in the driving mode in a manner that predetermined audio is output toward a warning target that is recognized based on a captured image captured by the imaging unit, and to control the speaker in a non-driving mode in a manner that the predetermined audio is output in a non-directional way.

15 Claims, 11 Drawing Sheets

DRIVING MODE

NON-DRIVING MODE

(51) Int. Cl.
*G08G 1/16* (2006.01)
*B60Q 1/04* (2006.01)
*B60Q 5/00* (2006.01)
*H04N 7/00* (2011.01)
*G03B 21/20* (2006.01)
*G03B 21/00* (2006.01)
*F21S 41/64* (2018.01)
*F21S 41/675* (2018.01)

(52) U.S. Cl.
CPC ............ *B60Q 5/008* (2013.01); *F21S 41/645* (2018.01); *F21S 41/675* (2018.01); *G03B 21/006* (2013.01); *G03B 21/2066* (2013.01); *G08G 1/166* (2013.01); *H04N 7/002* (2013.01)

(56) References Cited

U.S. PATENT DOCUMENTS

| | | |
|---|---|---|
| 2008/0311983 A1 | 12/2008 | Koempel et al. |
| 2009/0262192 A1 | 10/2009 | Schofield et al. |
| 2010/0073636 A1 | 3/2010 | Sasaki et al. |
| 2010/0208072 A1 | 8/2010 | Murano et al. |
| 2010/0253918 A1 | 10/2010 | Seder et al. |
| 2011/0128453 A1 | 6/2011 | Cho |
| 2011/0313617 A1 | 12/2011 | Omote et al. |
| 2012/0044090 A1* | 2/2012 | Kahler ............... B60Q 1/50 340/905 |
| 2012/0126969 A1 | 5/2012 | Wilbur et al. |
| 2012/0166042 A1* | 6/2012 | Kokido ............... B60Q 5/008 701/36 |
| 2012/0224060 A1* | 9/2012 | Gurevich ............. B60R 1/00 348/148 |
| 2012/0300072 A1 | 11/2012 | Kim |
| 2013/0083291 A1 | 4/2013 | Smithwick et al. |
| 2013/0154815 A1* | 6/2013 | Min ..................... B60Q 1/085 340/425.5 |
| 2013/0235351 A1 | 9/2013 | Sachdev et al. |
| 2013/0342363 A1 | 12/2013 | Paek et al. |
| 2014/0028980 A1* | 1/2014 | Othmer ............... G01C 21/365 353/14 |
| 2014/0055252 A1* | 2/2014 | Ascencio ............. B60Q 1/50 340/425.5 |

FOREIGN PATENT DOCUMENTS

| | | |
|---|---|---|
| JP | 2006-163863 A | 6/2006 |
| JP | 2011-213317 A | 10/2011 |
| WO | 2007/132961 A1 | 11/2007 |

OTHER PUBLICATIONS

Notice of Allowance and Fees Due for U.S. Appl. No. 14/023,755, dated Jan. 24, 2019, 08 pages.

Non-Final Rejection for U.S. Appl. No. 14/023,755, dated Aug. 9, 2018, 12 pages.

Advisory Action for U.S. Appl. No. 14/023,755, dated May 2, 2018, 03 pages.

Final Rejection for U.S. Appl. No. 14/023,755, dated Feb. 15, 2018, 17 pages.

Non-Final Rejection for U.S. Appl. No. 14/023,755, dated Aug. 24, 2017, 19 pages.

Advisory Action for U.S. Appl. No. 14/023,755, dated Mar. 21, 2017, 03 pages.

Final Rejection for U.S. Appl. No. 14/023,755, dated Jan. 13, 2017, 17 pages.

Non-Final Rejection for U.S. Appl. No. 14/023,755, dated May 23, 2016, 16 pages.

* cited by examiner

FIG. 1
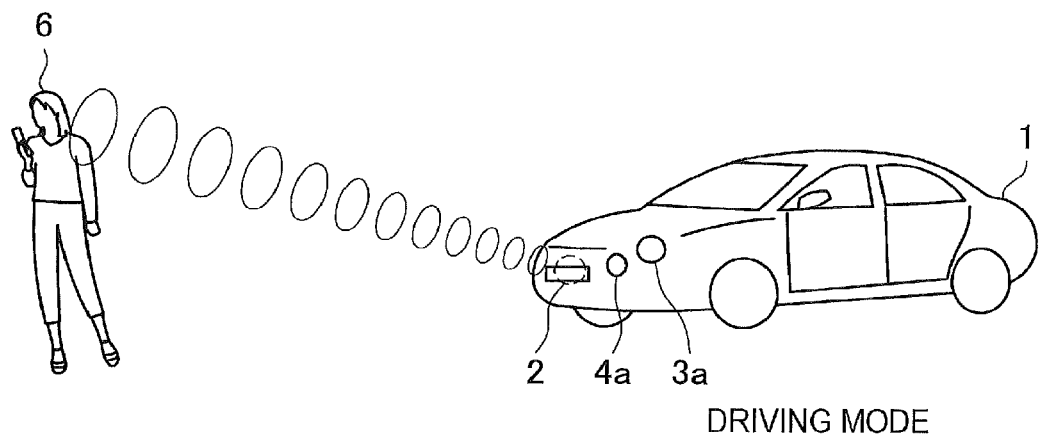
DRIVING MODE
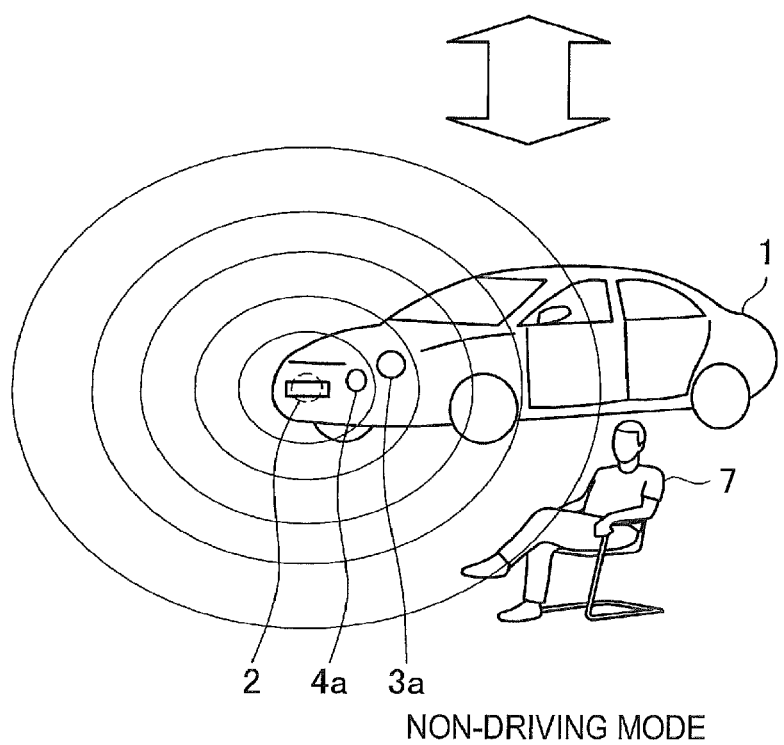
NON-DRIVING MODE

FIG. 4
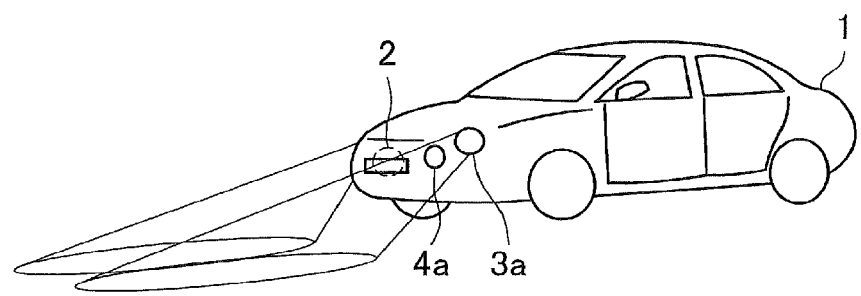
DRIVING MODE
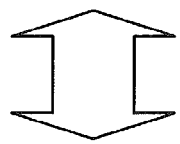
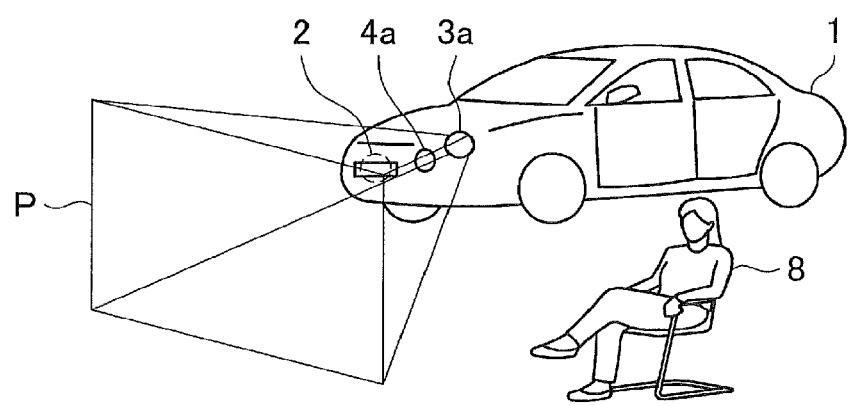
NON-DRIVING MODE

MOBILE OBJECT AND STORAGE MEDIUM

CROSS REFERENCE TO RELATED APPLICATIONS

The present application is a continuation application of U.S. patent application Ser. No. 14/023,755, filed on Sep. 11, 2013, which claims priority benefit of Japanese Patent Application No. JP 2012-208028 filed in the Japan Patent Office on Sep. 21, 2012. Each of the above-referenced applications is hereby incorporated herein by reference in its entirety.

BACKGROUND

The present disclosure relates to a mobile object and a storage medium.

Various techniques have been proposed for preventing car accidents, especially between a car and a pedestrian (including a bicycle rider). For example, JP 2006-163863T proposes a drive assist apparatus that shoots the perimeter of the car with a camera mounted thereon, and controls notification processing in accordance with a risk of the pedestrian's colliding with the car if any pedestrian is recognized on the basis of the shot image.

Hybrid cars and electric vehicles, which have recently gaining widespread use, make little noise during driven. Consequently, for example, pedestrians and bicycle riders walking and driving ahead hardly sense the car approaching, which leads to an increase in risk of a minor collision. Meanwhile, JP 2011-213317A proposes an in-vehicle approach notification system that controls a sound volume of warning sounds in accordance with driving speed of a vehicle. Specifically, the in-vehicle approach notification system can have a warning target sense the vehicle approaching without fail by use of a directional sound generator attached in a direction in which the vehicle travels, and can reduce noise for a circumferential environment such as houses facing to the street.

SUMMARY

Both of JP 2006-163863T and JP 2011-213317A describe that the apparatus and the system do not make noise because it is assumed that there is no minor collision involving a pedestrian while the cars are not driven. However, if some audio content is reproduced even while the cars are not driven, it is possible to enhance entertainment of the car.

The present disclosure therefore proposes a mobile object and a storage medium that are novel and improved, and can enhance both safety and entertainment.

According to an embodiment of the present disclosure, there is provided a mobile object including an imaging unit configured to capture a perimeter of the mobile object, a speaker configured to be capable of controlling directivity, a determination unit configured to determine whether the mobile object is in a driving mode, and a speaker control unit configured to control the speaker in the driving mode in a manner that predetermined audio is output toward a warning target that is recognized based on a captured image captured by the imaging unit, and to control the speaker in a non-driving mode in a manner that the predetermined audio is output in a non-directional way.

According to another embodiment of the present disclosure, there is provided a non-transitory computer-readable storage medium having a program stored therein, the program causing a computer to function as an imaging unit configured to capture a perimeter of a mobile object, a speaker configured to be capable of controlling directivity, a determination unit configured to determine whether the mobile object is in a driving mode, and a speaker control unit configured to control the speaker in the driving mode in a manner that predetermined audio is output toward a warning target that is recognized based on a captured image captured by the imaging unit, and to control the speaker in a non-driving mode in a manner that the predetermined audio is output in a non-directional way.

According to embodiments of the present disclosure, it becomes possible to enhance both safety and entertainment.

BRIEF DESCRIPTION OF THE DRAWINGS

FIG. 1 is a diagram for describing an overview of a control system according to an embodiment of the present disclosure;

FIG. 4 is a diagram for describing an overview of illumination unit control according to the present embodiment;

DETAILED DESCRIPTION OF THE EMBODIMENT(S)

Figure 2:
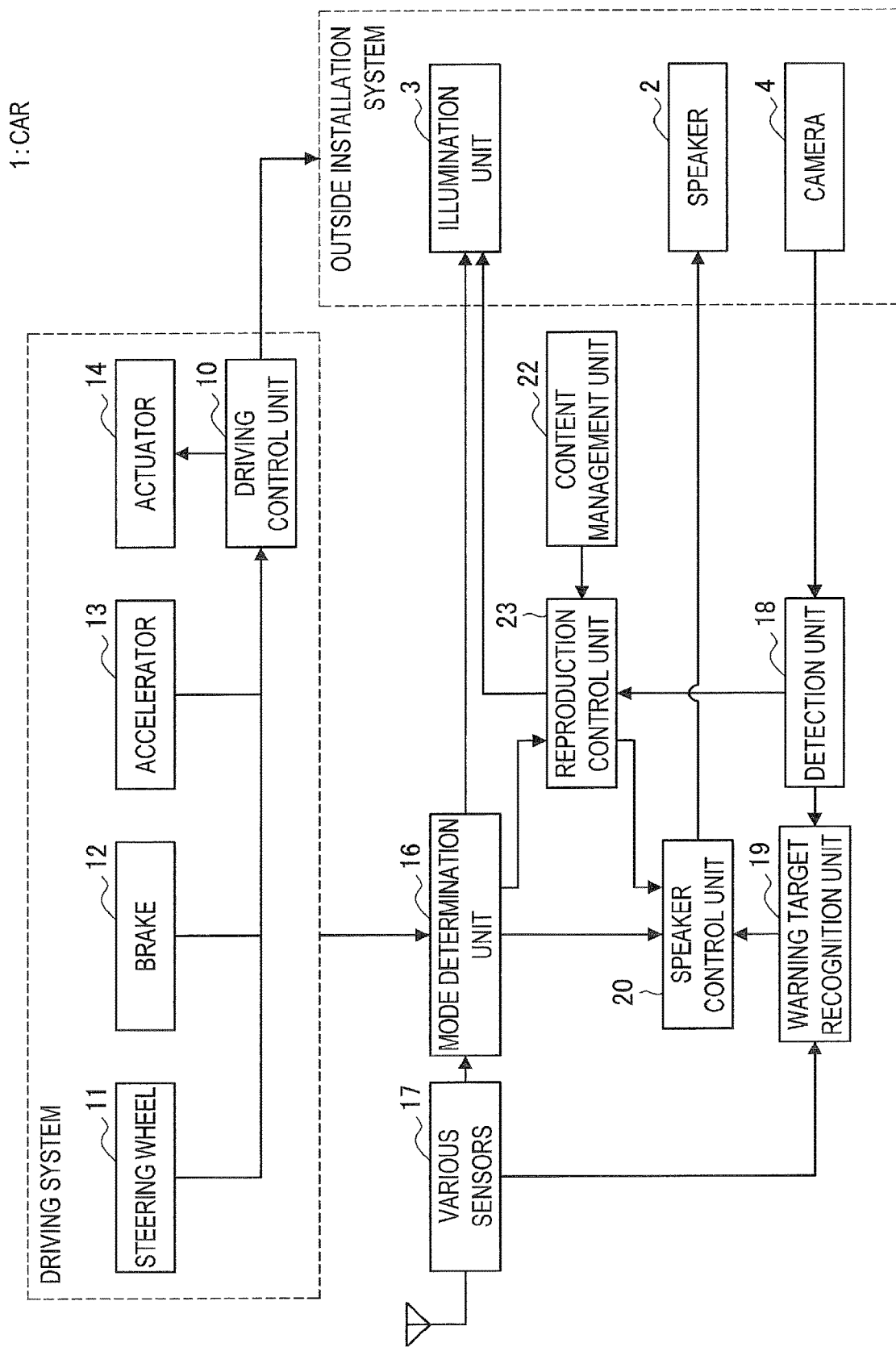
FIG. 2 is a block diagram for describing an example of an internal configuration of a car 1 according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order:
1. Overview of Control System According to Embodiment of Present Disclosure
2. Example of Internal Configuration of Mobile Object
3. Control Examples
   3-1. Speaker Control
   3-2. Illumination Unit Control
4. Conclusion

1. OVERVIEW OF CONTROL SYSTEM ACCORDING TO EMBODIMENT OF PRESENT DISCLOSURE

First, with reference to FIG. 1, an overview of a control system according to an embodiment of the present disclosure will be described.

FIG. 1 is a diagram for describing an overview of a control system (speaker control) according to an embodiment of the present disclosure. As illustrated in FIG. 1, a car 1 according to the present embodiment includes a speaker 2, a light outlet 3a, and an imaging lens 4a, which each face forward. Multiple speakers 2 may also be provided. The light outlet 3a is disposed in the left front as illustrated in FIG. 1, and another light outlet is disposed in the right front as a pair. The imaging lens 4a and another imaging lens may be disposed in the left front as illustrated in FIG. 1, and in the right front as a pair, respectively. Alternatively, only one imaging lens may be disposed at the center of the front.

As described above, control is performed such that a notification is not issued or warning sounds are not made while cars are not driven in both of JP 2006-163863T and JP 2011-213317A. However, for example, entertainment of a car can be enhanced by reproducing audio content from a speaker outside the car even if the car is not driven.

In view of such circumstances, there is provided a control system (mobile object) according to an embodiment of the present disclosure. The control system (mobile object) according to the embodiment of the present disclosure can enhance both safety and entertainment.

Specifically, the car 1 according to the present embodiment controls the directivity/omni-directivity of the speaker 2 in accordance with whether a driving mode is set. The driving mode means that a driving actuator such as tires, an engine, and a motor is driven (namely, the car is driven), and that the car 1 temporarily stops to wait for a traffic light. A non-driving mode means that the actuator is not driven, and that the car 1 is parked.

As illustrated in FIG. 1, in the driving mode, the car 1 shoots the perimeter by using the imaging lens 4a. Once the car 1 detects a warning target 6 on the basis of the shot image, the car 1 sets a directivity direction of the speaker 2 to the warning target and generates predetermined warning sounds toward the warning target. The car 1 according to the present embodiment can hereby avoid a minor collision with a pedestrian and a rider, thereby enhancing safety. To the contrary, in the non-driving mode, the car 1 sets the speaker 2 to be omni-directional, and reproduces audio content such as music and radio. A viewer 7 in the vicinity can therefore enjoy audio content such as music and radio outdoors, and entertainment of the car 1 is enhanced.

The overview of the control system according to the embodiment of the present disclosure has been described above. Next, an example of an internal configuration of the car 1 according to the present embodiment and control examples will be described in detail. In the example illustrated in FIG. 1, the car 1 (including a passenger car, a bus, and a truck) is shown as an example of the mobile object according to the embodiment of the present disclosure. However, the mobile object according to the embodiment of the present disclosure is not limited to the car 1. For example, an autobicycle, a bicycle, a wheel chair, a baby buggy, and a ship may also be adopted.

2. EXAMPLE OF INTERNAL CONFIGURATION OF MOBILE OBJECT

FIG. 2 is a block diagram for describing an example of an internal configuration of the car 1 according to the present embodiment. As illustrated in FIG. 2, the car 1 according to the present embodiment includes a configuration of a driving system including a driving control unit 10, a steering wheel 11, a brake 12, an accelerator 13, and an actuator 14, and a configuration of an outside installation system including a speaker 2, an illumination unit 3, and a camera 4. The car 1 further includes a mode determination unit 16, various sensors 17, a detection unit 18, a warning target recognition unit 19, a speaker control unit 20, a content management unit 22, and a reproduction control unit 23.

(Driving System)

The steering wheel 11, the brake 12, and the accelerator 13 are driving input devices for control information necessary for drive, and are connected to the driving control unit 10, as illustrated in FIG. 2. The driving control unit 10 drives the actuator 14 such as tires, an engine, and a motor on the basis of manipulation information from each driving input device.

(Speaker)

The speaker 2 has a function of outputting audio (sounds) outward from inside the car. The speaker control unit 20 according to the present embodiment can set directivity/omni-directivity, which means that the speaker control unit 20 can control a range or a direction in which the sounds reach. The speaker 2 according to the present embodiment can hereby set a directivity direction toward a warning target through the speaker control unit 20, and can output audio toward the warning target. The speaker 2 can also output audio to the perimeter (every direction) of the car 1 once set to be omni-directional. The speaker 2 may generate warning sounds when a horn button disposed at the steering wheel 11 is pushed down. A speaker array or motor drive may set the directivity of the speaker 2.

(Illumination Unit)

The illumination unit 3 has a function of illuminating the outside of the car 1 from the light outlet 3a provided on the exterior of the car 1. The illumination unit 3 according to the present embodiment has a headlight function and a projector function. The headlight function and the projector function can be switched in accordance with a mode determination result of the mode determination unit 16. A configuration of the illumination unit 3 according to the present embodiment will be described in "3-2. Illumination Unit Control" in detail. The illumination unit 3 may also control switching on and off of the headlight function and an illumination direction in accordance with manipulation of a headlight switch disposed at the driver's seat.

(Camera)

The camera 4 is an imaging unit including a lens system that is disposed on the exterior of the car 1, and includes an imaging lens 4a, a diaphragm, a zoom lens and a focus lens, a drive system causing a focus operation and a zoom operation to be performed on the lens system, and a solid-state image sensor array performing photoelectric conversion on imaging light acquired in the lens system to generate imaging signals. For example, the solid-state image sensor array may be realized as a charge coupled device (CCD) sensor array and a complementary metal oxide semiconductor (CMOS) sensor array. The imaging lens 4a is arranged to face forward, as illustrated in FIG. 1, such that the imaging lens 4a captures images in the traveling direction of the car 1 as a subject direction. The camera 4 can therefore capture a warning target that possibly collides with the car in the driving mode.

The camera 4 captures viewers and listeners around the car 1 in the non-driving mode. The camera 4 according to the present embodiment may therefore have a physical structure for changing the subject direction. Alternatively, the imaging lens 4a of the camera 4 may be a wide angle lens. Alternatively, multiple cameras 4 may be provided in the front of the car 1 and on the sides of the car 1.

(Mode Determination Unit)

The mode determination unit 16 determines whether the car 1 is in the driving mode. Specifically, the mode determination unit 16 determines which of the driving mode and non-driving mode is set, on the basis of whether a predetermined condition is satisfied by information (such as speed information, an odometer value, a vibration measurement value, position information and a driving sound measurement value) detected by the various sensors mounted on the car 1. For example, when an odometer value and position information are changing every moment, or when a vibration measurement value and a driving sound measurement value are each beyond a predetermined value, the car 1 is driven. The mode determination unit 16 therefore determines that the driving mode is set. The mode determination unit 16 may also determine that the driving mode is set, when the driving control unit 10 performs driving control on the actuator 14.

To the contrary, when an odometer value and position information do not change, or when a vibration measurement value and a driving sound measurement value are each below the predetermined value, the car 1 is parked. The mode determination unit 16 therefore determines that the non-driving mode is set. The mode determination unit 16 may also determine that the non-driving mode is set, when the driving control unit 10 does not perform driving control on the actuator 14.

The mode determination unit 16 outputs the determination result to the speaker control unit 20, the illumination unit 3, or the reproduction control unit 23.

(Various Sensors)

The various sensors 17 are mounted on the car 1, and detect external environment information of the car 1 and a state of the car 1. Specifically, the various sensors 17 are, for example, a communication unit, a present position information measurement unit, a radar, a speed sensor, an odometer, a vibration measuring instrument, a driving sound measuring instrument, a motion sensor.

The communication unit has a function of transmitting data to and receiving data from the outside. The present position information measurement unit measures present position information by using, for example, a global positioning system (GPS). Specifically, a present position is measured on the basis of signals received by the communication unit from multiple GPS satellites.

The radar is a sensor that detects an object around the car through radio waves and the like. The object present around the car can hereby be detected, and a positional relationship (distance) between the car and the object can also be acquired.

The speed sensor measures driving speed of the car. The odometer measures mileage of the car. The vibration measuring instrument measures vibration of the car. The driving sound measuring instrument measure sounds (such as engine sounds) of the car during driven.

The motion sensor detects a person by using infrared radiation, ultrasonic waves, visible light, or the like. In the present embodiment, mainly the detection unit 18 detects a person from a captured image as a unit for detecting a person. Meanwhile, the car 1 according to the present embodiment may also detect a person by using the motion sensor. The motion sensor may detect a distance to a person.

(Detection Unit)

The detection unit 18 has a function of detecting a person on the basis of a captured image captured by the camera 4. Specifically, for example, when the car 1 is in the driving mode, the detection unit 18 detects a pedestrian and a rider ahead. To the contrary, when the car 1 is in the non-driving mode, the detection unit 18 detects a person (viewer) in the vicinity thereof. The detection unit 18 outputs the detection result to the warning target recognition unit 19 or the reproduction control unit 23.

(Warning Target Recognition Unit)

The warning target recognition unit 19 has a function of recognizing the person detected by the detection unit 18 as a warning target. Specifically, the warning target recognition unit 19 recognizes the detected person as a warning target in accordance with a distance (positional relationship) between the person and the car 1, and relative speed of the person and the car 1. The warning target recognition unit 19 can determine the possibility or a danger level of the person's colliding with the car 1 on the basis of the distance between the person and the car 1, and the relative speed of the person and the car 1. The warning target recognition unit 19 outputs, to the speaker control unit 20, a position/direction, and a warning level (danger level) of a warning target recognized as a warning target.

The warning target recognition unit 19 calculates a distance between the detected person and the car 1, and relative speed thereof on the basis of image information included in the detection result, and information detected by the various sensors 17 (such as a radar, a present position information acquisition unit, and a speed sensor) provided on the car 1. Additionally, the warning target recognition unit 19 according to the present embodiment can also recognize a warning target on the basis of only detection information from the various sensors 17 (such as a motion sensor) provided on the car 1.

(Speaker Control Unit)

The speaker control unit 20 controls the speaker 2 in accordance with a mode determination result of the mode determination unit 16. Specifically, if the mode determination unit 16 determines that the "driving mode" is set, the speaker control unit 20 according to the present embodiment sets the directivity of the speaker 2 to "directivity." A directivity direction of the speaker 2 is set to the position/direction of the warning target recognized by the warning target recognition unit 19, and the speaker control unit 20 controls the speaker 2 to output predetermined warning sounds (a sound image is localized to the warning target). The speaker control unit 20 may also control the details and the sound volume of the warning sounds in accordance with a warning level recognized by the warning target recognition unit 19.

To the contrary, if the mode determination unit 16 determines that the "non-driving mode" is set, the speaker control unit 20 according to the present embodiment sets the directivity of the speaker 2 to "omni-directivity." The speaker control unit 20 controls the speaker 2 to output audio content on which the reproduction control unit 23 performs reproduction control.

(Content Management Unit)

The content management unit 22 has a function of accumulating/managing various pieces of content. Specifically, the content management unit 22 may also accumulate/manage video content such as videos, images, and games in addition to the audio content. The content management unit 22 may accumulate the content in advance, may receive the content from the outside (such as a network, and a user terminal), or may acquire the content from a recording medium that is connected by a user.

(Reproduction Control Unit)

The reproduction control unit 23 has a function of reproducing content input from the content management unit 22 in the non-driving mode in accordance with an instruction of a user. The user can designate content that the user would like to view, by using a manipulation input unit (such as a touch panel display, various buttons, and a switch) installed in the car, and can input reproduction manipulation. Alternatively, the user can input reproduction manipulation with a remote controller.

Specifically, the reproduction control unit 23 performs reproduction control such that video content is projected using the projector function of the illumination unit 3 in the non-driving mode, and performs reproduction control such that audio content is output from the speaker 2.

In performing projection control on video content, the reproduction control unit 23 can also perform feedforward/feedback control based on a captured image (video) captured by the camera 4. Specifically, for example, the reproduction control unit 23 may control a projection direction and a size (shape) of an image that is to be projected in accordance with a position of a person (viewer) detected from the captured image. The reproduction control unit 23 may recognize distortion in a projected image on the basis of a captured image obtained by the camera 4 capturing the projected image, and may perform signal processing of correcting the distortion through an affine transformation. The reproduction control unit 23 may also recognize colors of the projected image on the basis of the captured image obtained by the camera 4 capturing the projected image, and may perform signal processing of adjusting color information of the image.

The specific configuration of the car 1 according to the present embodiment has been described above in detail. Next, control examples of the car 1 according to the present embodiment will be described.

3. CONTROL EXAMPLES

[3-1. Speaker Control]

Figure 3:
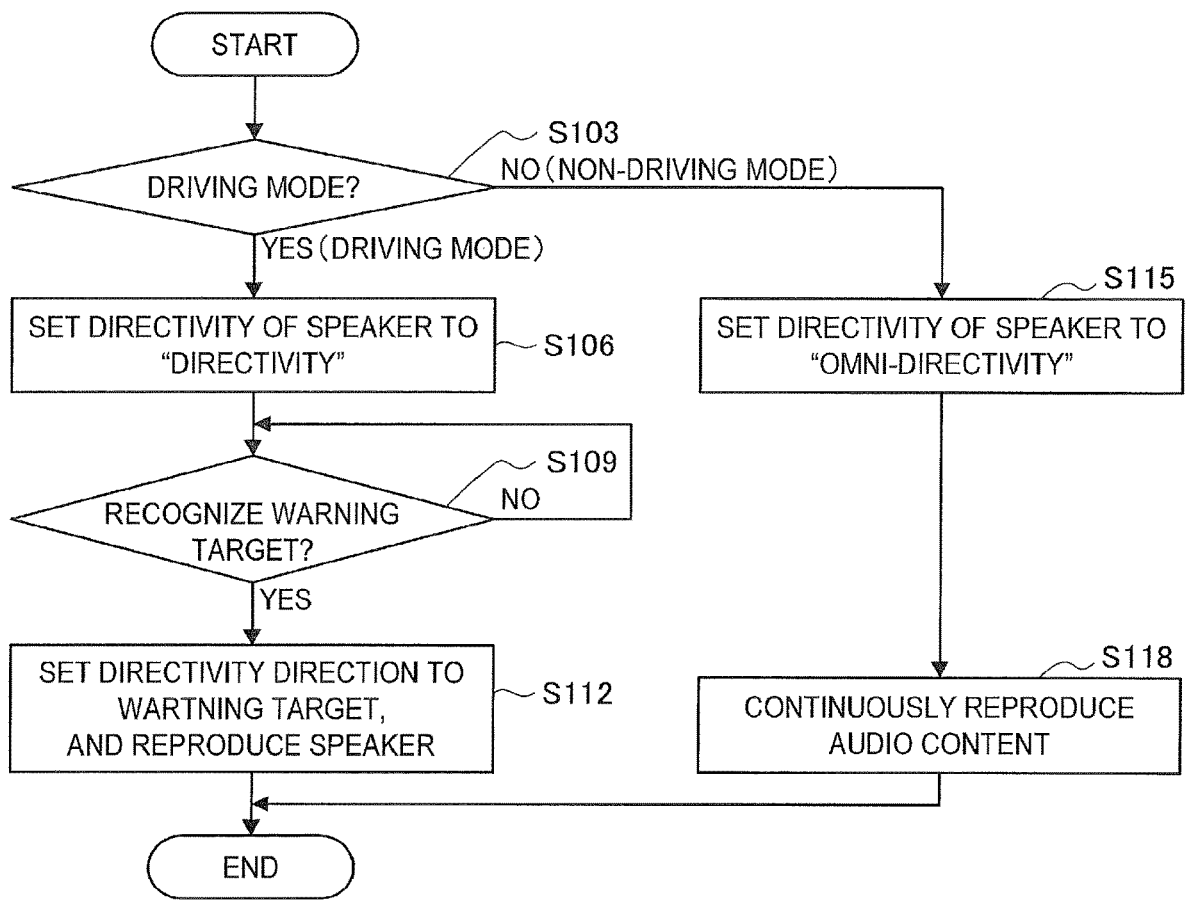
FIG. 3 is a flowchart illustrating operational processing of speaker control according to the present embodiment.

As described in FIG. 1, the car 1 according to the present embodiment sets the directivity of the speaker 2 to a warning target and generates warning sounds in the driving mode, and reproduces input content in the non-driving mode, thereby enhancing both safety and entertainment. With reference to FIG. 3, such control on the speaker 2 according to the present embodiment will be specifically described below.

FIG. 3 is a flowchart illustrating operational processing of speaker control according to the present embodiment. As illustrated in FIG. 3, first, in step S103, the mode determination unit 16 determines whether the car 1 is in the driving mode.

Next, if it is determined that the driving mode is set (S103/Yes), the speaker control unit 20 sets, in step S106, the directivity of the speaker 2 to "directivity."

Next, in step S109, the warning target recognition unit 19 recognizes the warning target 6. The warning target recognition unit 19 may also recognize, as the warning target 6, a person detected by the detection unit 18 on the basis of a captured image captured by the camera 4.

Next, if the warning target 6 is recognized (S109/Yes), the speaker control unit 20 sets, in step S112, a directivity direction of the speaker 2 toward the warning target 6, and controls the speaker 2 to reproduce predetermined warning sounds (audio). As the warning sounds generated for the warning target 6, speech reporting danger (such as "watch out") and special sounds (such as warning sounds, horn sounds, a siren, and alarm sounds) may be used.

To the contrary, if it is determined that the driving mode is not set (the non-driving mode is set) (S103/NO), the speaker control unit 20 sets, in step S115, the directivity of the speaker 2 to "omni-directivity."

Next, in step S118, the speaker control unit 20 performs control such that audio content to be reproduced by the reproduction control unit 23 is continuously reproduced from the speaker 2. As illustrated in FIG. 1, a listener 7 around the car 1 can hereby enjoy audio content such as music and radio outside the car.

[3-2. Illumination Unit Control]

Speaker control in the driving mode/non-driving mode has been described above. However, control examples of the car 1 according to the embodiment of the present disclosure are not limited to the example illustrated in FIG. 3, and the illumination unit may additionally switch the headlight function and the projector function. With reference to FIGS. 4 to 11, speaker control and illumination unit control in the driving mode/non-driving mode will be specifically described below.

(3-2-1. Overview)

FIG. 4 is a diagram for describing an overview of speaker control and illumination unit control according to the present embodiment. The illumination unit 3 according to the present embodiment has a headlight function and a projector function. As illustrated in FIG. 4, the illumination unit 3 uses the headlight function to illuminate the area in the traveling direction in the driving mode, and uses the projector function to project an image P (video content) on an outside wall or the like in the non-driving mode.

A viewer 8 in the vicinity can hereby enjoy content such as videos and games outdoors so that entertainment of the car 1 is enhanced. In addition, sounds of the video content are output from the speaker 2, which has been set to be omni-directional, so that the viewer 8 can enjoy a movie and games even outdoors.

Next, with reference to FIGS. 5 to 7, configuration examples of the illumination 3 according to the present embodiment, which has the headlight function and the projector function, will be described.

(3-2-2. Configuration Examples of Illumination Unit)

The illumination unit 3 according to the present embodiment may be configured to have a headlight unit and a projector unit, or may be configured to cause the projector unit to realize the headlight function and the projector function. First, with reference to FIGS. 5 and 6, a configuration of the illumination unit 3 including the headlight unit and the projector unit will be described.

(First Configuration Example of Illumination Unit)

Figure 5:
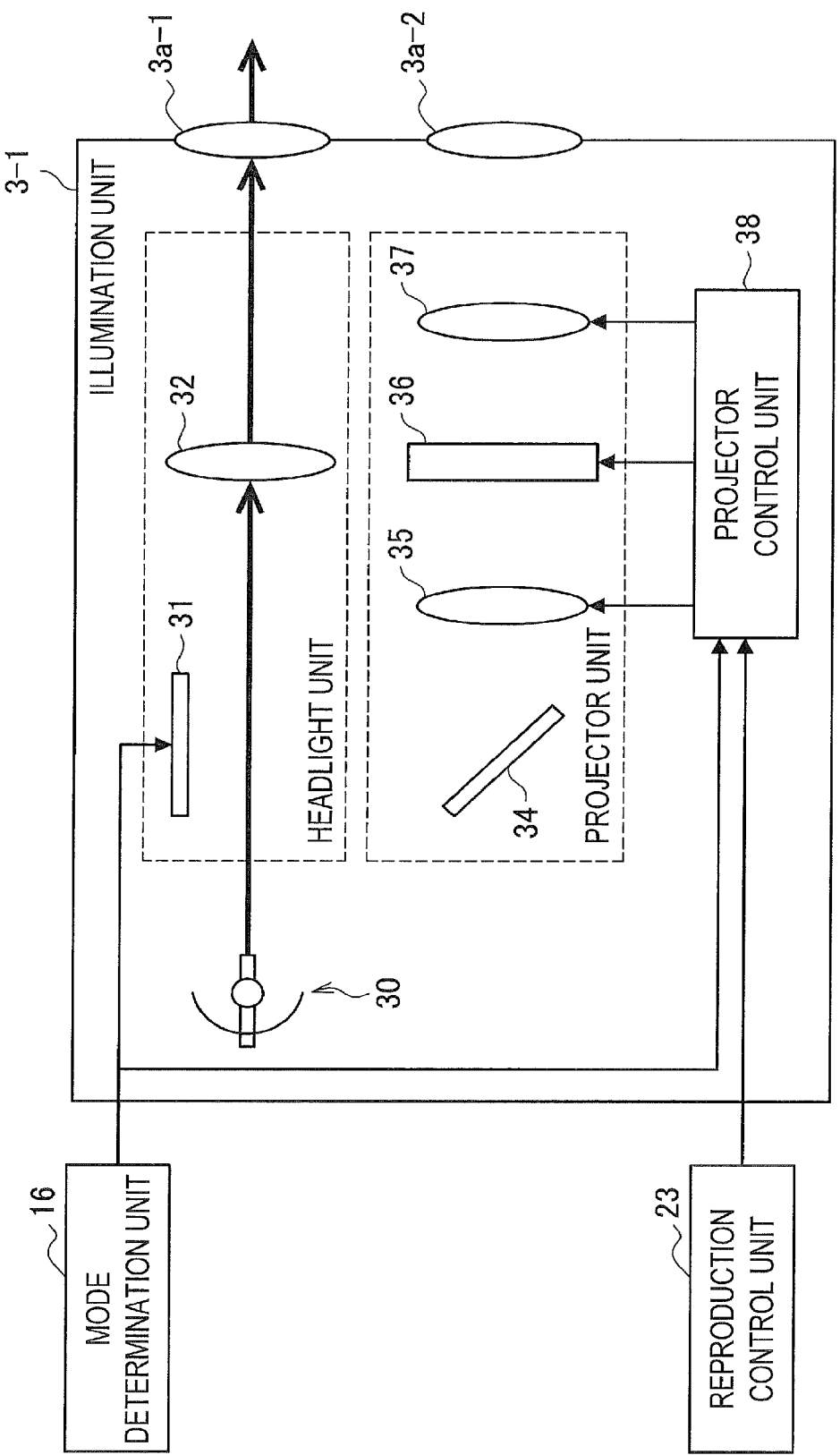
FIG. 5 is a block diagram for describing that a headlight function is realized in a first configuration example of the illumination unit according to the present embodiment.

FIG. 5 is a block diagram for describing that the headlight function is realized in a first configuration example of the illumination unit 3. FIG. 6 is a block diagram for describing that the projector function is realized in the first configuration example of the illumination unit 3.

Figure 6:
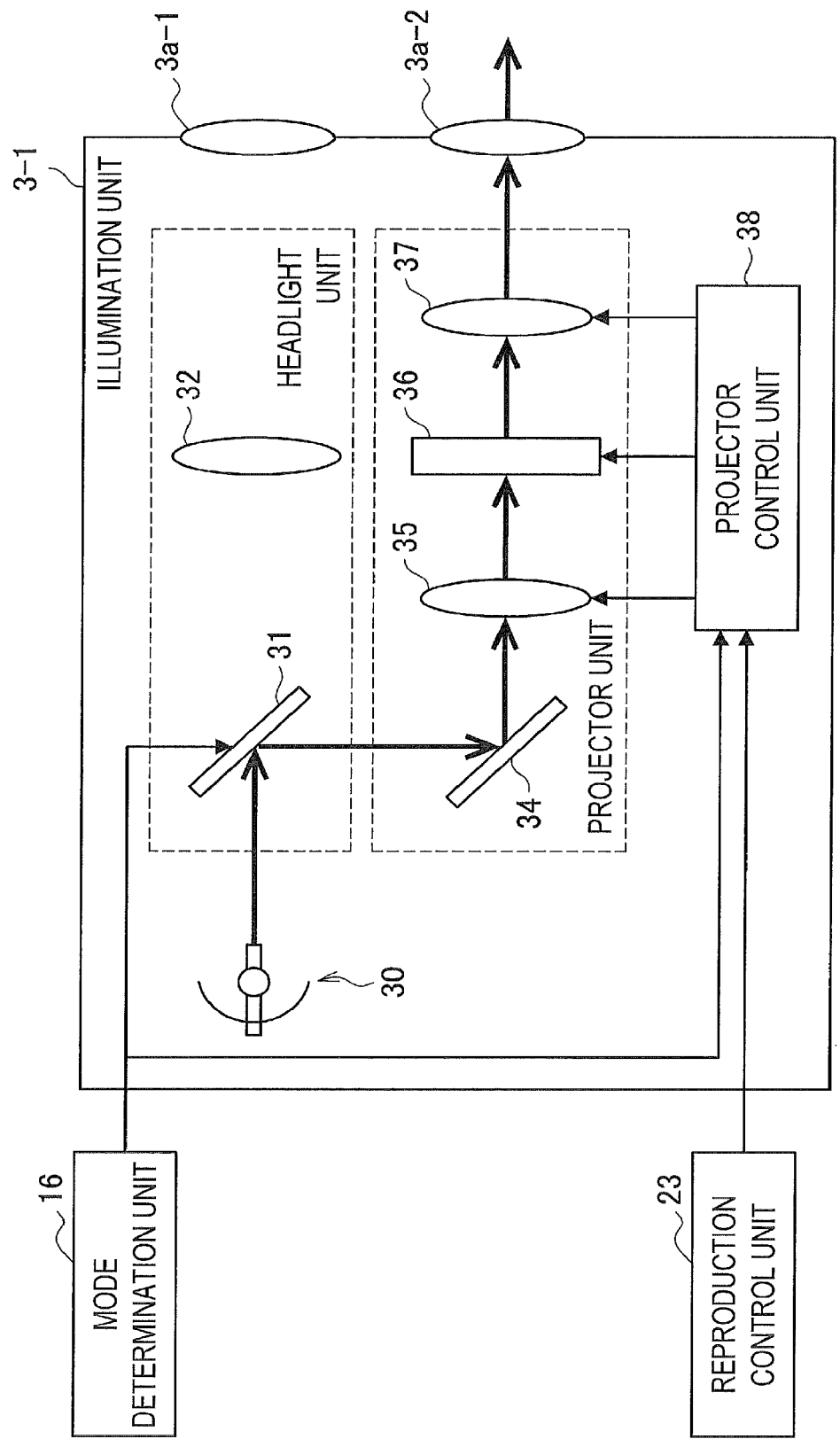
FIG. 6 is a block diagram for describing that a projector function is realized in the first configuration example of the illumination unit according to the present embodiment.

As illustrated in FIGS. 5 and 6, an illumination unit 3-1 according to the present embodiment includes light outlets 3a-1 and 3a-2, a light source 30, reflector plates 31 and 34, a light lens 32, a condenser lens 35, a liquid crystal panel 36, a projector lens 37, and a projector control unit 38.

The light source 30 includes a lamp that emits rays of light, and a reflector mirror.

The reflector plate 31 is disposed at such a position and in such an orientation that light emitted from the light source 30 is incident in a predetermined direction in accordance with a determination result output from the mode determination unit 16. For example, if the mode determination unit 16 determines that the driving mode is set, the reflector plate 31 is, as illustrated in FIG. 5, disposed at such a position and in such an orientation that the light emitted from the light source 30 is incident in a direction of the light lens 32. The light emitted from the light source 30 hereby goes out on a street from the light outlet 3a-1 through the light lens 32, and illuminates the area in the traveling direction of the car 1.

To the contrary, if the mode determination unit 16 determines that the non-driving mode is set, the reflector plate 31 is, as illustrated in FIG. 6, disposed at such a position and in such an orientation that the light emitted from the light source 30 is incident in a direction of the projector unit. The light emitted from the light source 30 is hereby, as illustrated in FIG. 6, reflected on the reflector plates 31 and 34, goes out from the light outlet 3a-2 via the condenser lens 35, the liquid crystal panel 36, and the projector lens 37, and projects a video in front of the car 1.

Specifically, the condenser lens 35 collects the incident light, and has the collected light go out on the liquid crystal panel 36. The liquid crystal panel 36 modulates the incident light (realizes a function as a light modulation unit for forming an image in accordance with video signals), and has the modulated light go out on the projector lens (projection optical system) 37. The projector lens 37 magnifies and projects the incident light onto a screen (such as an outside wall). The condenser lens 35, the liquid crystal panel 36, and the projector lens 37 are controlled by the projector control unit 38 to output appropriate image information from the light outlet 3a-1.

The projector control unit 38 has video content input therein, which is to be subjected to reproduction control by the reproduction control unit 23, and drives the liquid crystal panel 36 on the basis of the video content (video signals). The projector control unit 38 also drives the condenser lens 35 and the projector lens 37 in accordance with control of the reproduction control unit 23 to adjust illuminance, a projection direction, focus, and the like of a projected image.

(Second Configuration Example of Illumination Unit)

Next, with reference to FIG. 7, a configuration of the projector unit for realizing the headlight function and the projector function will be described. FIG. 7 is a block diagram for describing a second configuration example of the illumination unit 3.

Figure 7:
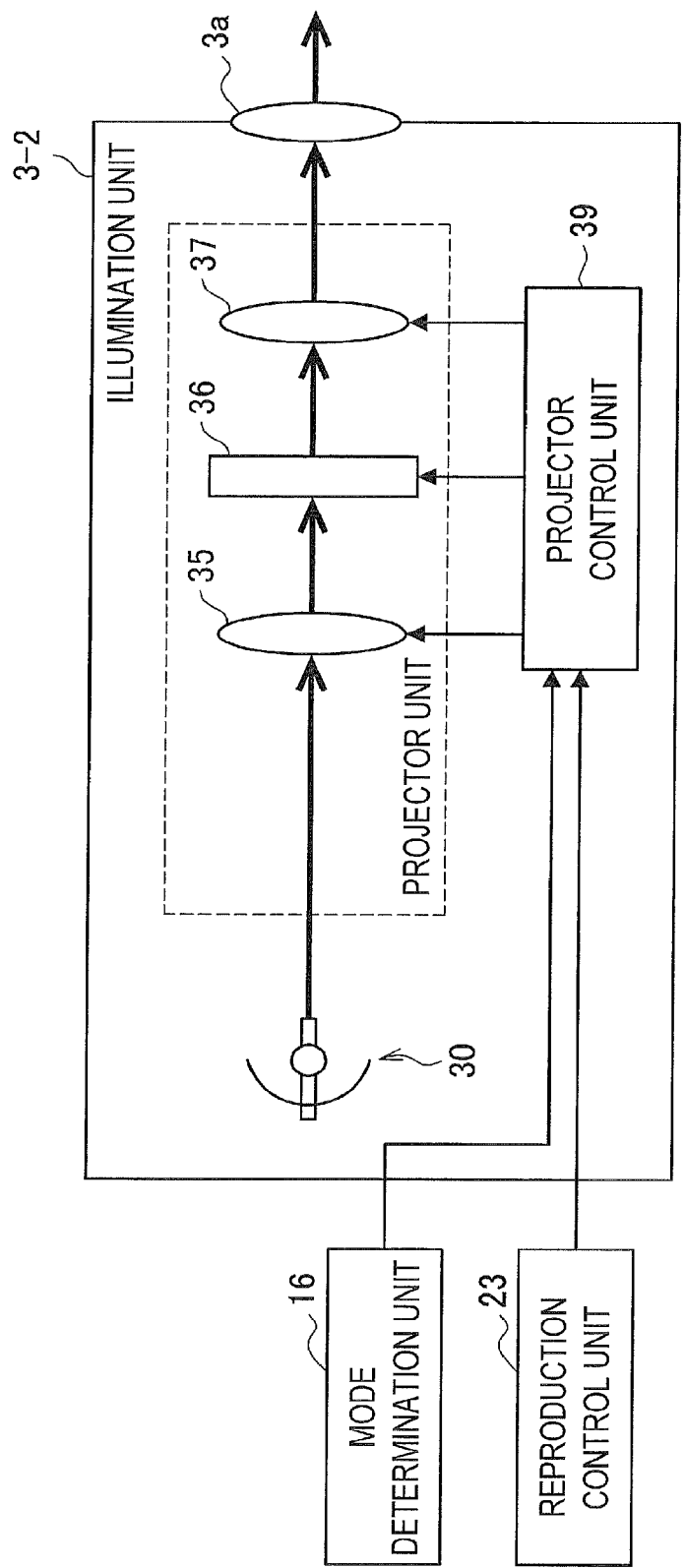
FIG. 7 is a block diagram for describing a second configuration example of the illumination unit according to the present embodiment.

As illustrated in FIG. 7, an illumination unit 3-2 includes a light outlet 3a, a light source 30, a condenser lens 35, a liquid crystal panel 36, a projector lens 37, and a projector control unit 39.

If the mode determination unit 16 determined that the driving mode is set, the projector control unit 39 performs light modulation control on the liquid crystal panel 36 such that a video (video for projecting white light) is formed which allows white light to go out. The projector control unit 39 controls the condenser lens 35 and the projector lens 37 to have appropriate illuminance as a headlight and to face in an appropriate projection direction. In this way, the projector control unit 39 uses the projector unit to realize the headlight function.

To the contrary, if the mode determination unit 16 determines that the non-driving mode is set, the projector control unit 39 drives the liquid crystal panel 36 on the basis of video content (video signals) input by the reproduction control unit 23 in the same way as the projector control unit 38. The projector control unit 39 also drives the condenser lens 35 and the projector lens 37 in accordance with control of the reproduction control unit 23 to adjust illuminance, a projection direction, focus, and the like of a projected image.

(3-2-3. Operational Processing)

Each configuration of the illumination units 3-1 and 3-2 according to the present embodiment has been specifically described above. Next, with reference to FIG. 8, control examples of the illumination unit 3 according to the present embodiment will be described.

Figure 8:
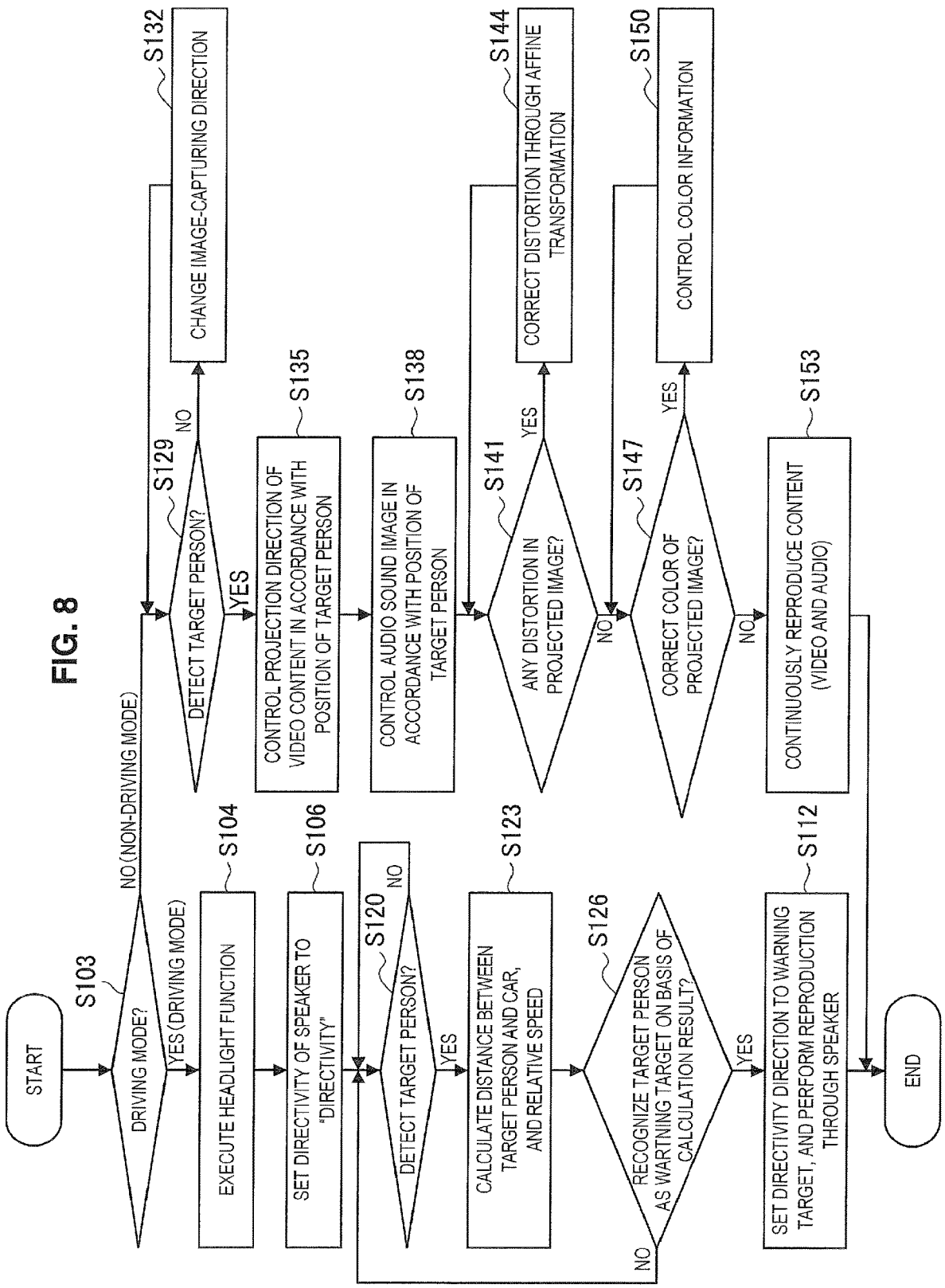
FIG. 8 is a flowchart illustrating operational processing of speaker control and illumination unit control according to the present embodiment.

FIG. 8 is a flowchart illustrating operational processing of illumination unit control according to the present embodiment. As illustrated in FIG. 8, first, in step S103, the mode determination unit 16 determines whether the car 1 is in the driving mode.

Next, if it is determined that the driving mode is set (S103/Yes), the illumination unit 3 executes, in step S104, the headlight function. In this way, the illumination unit 3 functions as a headlight that illuminates the area in the traveling direction in the driving mode.

Subsequently, in step S106, the speaker control unit 20 sets the directivity of the speaker 2 to "directivity."

Next, in step S120, the detection unit 18 detects a person on the basis of a captured image captured by the camera 4.

Subsequently, if the detection unit 18 detects a target person (S120/YES), the warning target recognition unit 19 calculates, in step S123, a distance between the detected target person and the car 1, and relative speed thereof.

Next, in step S126, the warning target recognition unit 19 determines on the basis of the calculation result whether the target person is recognized as the warning target 6.

Subsequently, if the target person is recognized as the warning target 6 (S126/Yes), the speaker control unit 20 sets, in step S112, a directivity direction of the speaker 2 toward the warning target 6, and controls the speaker 2 to reproduce predetermined warning sounds (audio). In this way, the speaker 2 sets the directivity direction to the warning target 6, and outputs warning sounds in the driving mode.

To the contrary, if it is determined in step S103 that the driving mode is not set (the non-driving mode is set) (S103/NO), the detection unit 18 detects, in step S129, the target person on the basis of the captured image captured by the camera 4. Here, the detected target person is the viewer 8 around the car 1. According, for example, an imaging direction of the camera 4 faces the area in front of the car 1 so that the detection unit 18 is sometimes incapable of detecting the viewer 8 next to the car 1.

If the target person is not detected (S129/NO) and the camera 4 is structured to physically change an image-capturing direction in step S132, the image-capturing direction may therefore be changed. Consequently, the car 1 according to the present embodiment makes no blind spot with respect to the camera 4. The car 1 according to the present embodiment also disposes cameras 4 in multiple places not to make any blind spot.

Next, in step S135, the reproduction control unit 23 controls a projection direction in which input video content is projected from the illumination unit 3, on the basis of a position and an orientation of the target person (viewer 8), which has been detected by the detection unit 18. The car 1 can hereby project video content at a position suitable for the position of the target person outside the car. In this way, the illumination unit 3 functions as a projector that projects a video in the non-driving mode.

Subsequently, in step S138, the speaker control unit 20 may set the directivity of the speaker 2, on the basis of which audio content to be reproduced by the reproduction control unit 23 is output from the speaker 2, on the basis of the position and the direction of the target person (viewer 8), which has been detected by the detection unit 18. The directivity of the speaker 2 is set to omni-directivity as illustrated in step S115 of FIG. 3 as a default in the non-driving mode. However, if the viewer 8 issues a directivity setting instruction, a directivity direction may be set to a direction of the target person (viewer 8).

Next, in step S141, the reproduction control unit 23 determines, on the basis of a captured image obtained by capturing the projected video content (projected image), whether the projected image has distortion.

Subsequently, if it is determined that distortion is present (S141/YES), the reproduction control unit 23 corrects, in step S144, the distortion in the projected image through an affine transformation.

Next, in step S147, the reproduction control unit 23 determines, on the basis of the captured image obtained by capturing the projected image, whether colors of the projected image want correcting. For example, if a video is projected outdoors, colors should be corrected in accordance with a color on a projection plane (screen).

Subsequently, if it is determined that colors should be corrected (S147/YES), the reproduction control unit 23 controls, in step S150, color information of the video signals.

In step S153, the reproduction control unit 23 controls the illumination unit 3 and the speaker control unit 20 such that video content and audio content are continuously reproduced.

(3-2-4. Examples of Video Projection)

Figure 9:
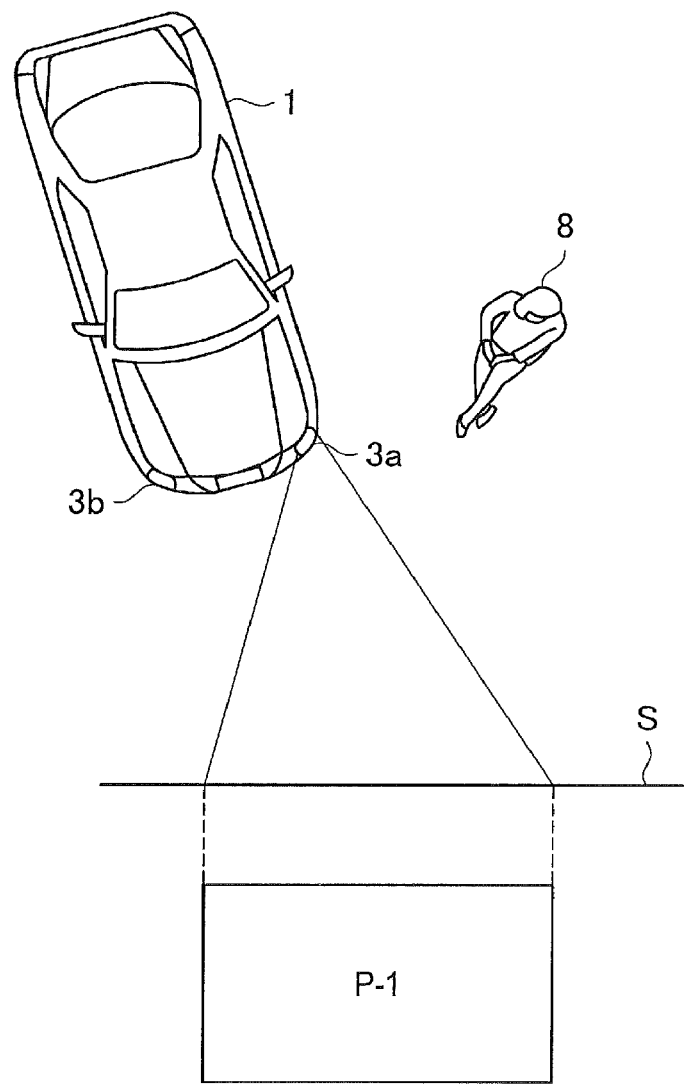
FIG. 9 is a diagram for describing a first example of video projection according to the present embodiment.
Figure 10:
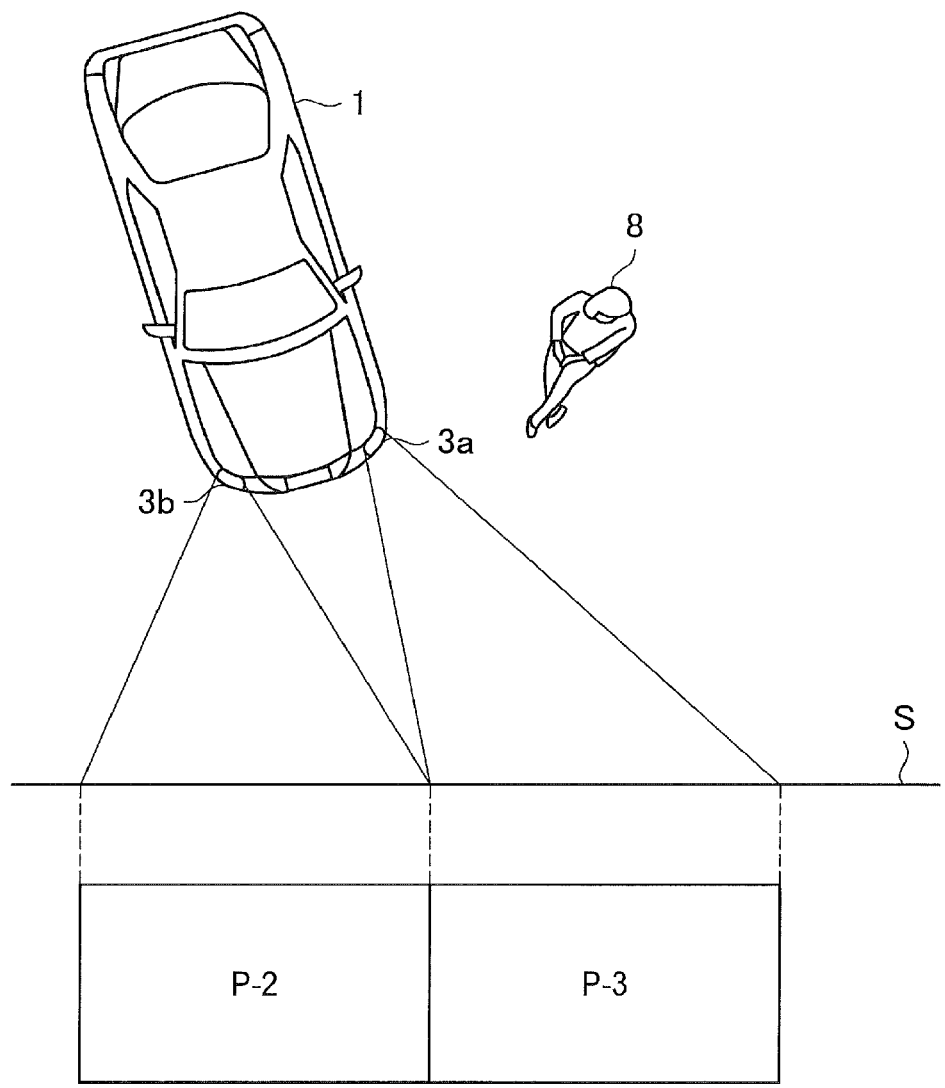
FIG. 10 is a diagram for describing a second example of video projection according to the present embodiment.
Figure 11:
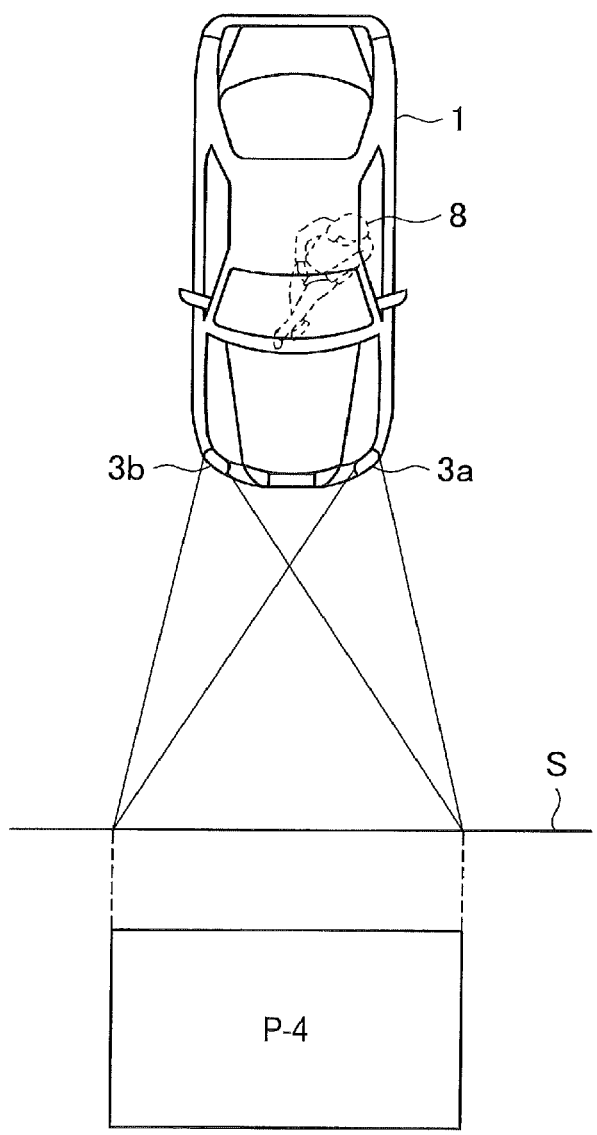
FIG. 11 is a diagram for describing a third example of video projection according to the present embodiment.

Speaker control and illumination unit control according to the present embodiment have been described above. As described above, the car 1 according to the present embodiment projects a video from the light outlet 3a disposed in the front of the car 1. A user can hereby enjoy movies or the like even outdoors with ease. With reference to FIGS. 9 to 11, examples of video projection performed by the illumination unit 3 according to the present embodiment will be described.

FIG. 9 is a diagram for describing a first example of video projection. As illustrated in FIG. 9, if the car 1 according to the present embodiment has multiple light outlets 3a and 3b disposed in the front of the car 1, the car 1 projects a video P-1 onto a wall S from the light outlet 3a in accordance with a position of the viewer 8.

FIG. 10 is a diagram for describing a second example of video projection. As illustrated in FIG. 10, the car 1 according to the present embodiment projects videos P-2 and P-3 onto the wall S from the multiple light outlets 3a and 3b, respectively, which are disposed in the front of the car 1. If a single video is divided into multiple videos P-2 and P-2, the divided videos can have a wider (larger) area than projected as the only single video P-1. The videos P-2 and P-3 may be different from each other. The car 1 can concurrently project multiple videos onto different places by changing the projection position.

FIG. 11 is a diagram for describing a third example of video projection according to the present embodiment. As illustrated in FIG. 11, the car 1 projects the same videos onto the wall S from the respective light outlets 3a and 3b, and overlays the two videos as a video P-4. If multiple videos are overlaid and projected in this way, image quality (brightness and resolution) can be better than image quality of video projected as an only single video. If polarizing filters (circularly polarizing filter and linearly polarizing filter) having different characteristics are applied to the left and right illumination units 3, which have light go out on the left and right light outlets 3a and 3b, and if the two videos are projected so as to be overlaid, a 3D video can be projected. In this case, the viewer 8 also watches the 3D video by using polarizing filter glasses. Other than such a polarizing technique, the illumination unit 3 can also project a 3D video in combination with shutter synchronization of shutter glasses worn by the viewer 8.

In the example illustrated in the FIG. 11, the viewer 8 views, from inside the car, the video P-4 projected outside the car. In this way, it is presupposed in the car 1 according to the present embodiment that a projected image is viewed from inside the car. In this case, the speaker control unit 20 performs control such that sounds of video content are reproduced from a speaker (not shown) mounted in the car.

4. CONCLUSION

As described above, the car 1 according to the present embodiment can enhance both safety and entertainment.

More specifically, the car 1 according to the present embodiment sets a directivity direction of the speaker 2 to the recognized warning target 6, and generates predetermined warning sounds in the driving mode. To the contrary, the car 1 according to the present embodiment sets the speaker 2 to be omni-directional, and reproduces content such as music in the non-driving mode. In this way, the car 1 according to the present embodiment can enhance both safety and entertainment by controlling the directivity/omni-directivity of the speaker 2.

The car 1 according to the present embodiment performs control, in accordance with which of the driving mode and the non-driving mode is set, such that the headlight function and the projector function of the illumination unit 3 are switched. The car 1 according to the present embodiment can hereby enhance both safety and entertainment by controlling the directivity/omni-directivity of the speaker 2.

It should be understood by those skilled in the art that various modifications, combinations, sub-combinations and alterations may occur depending on design requirements and other factors insofar as they are within the scope of the appended claims or the equivalents thereof.

For example, the speaker 2 and the illumination unit 3 may be integrally structured. Specifically, a light equipped with a speaker may be used that has the speaker 2 disposed at the center of the light outlet 3. The camera 4 may further be integrated into the light equipped with the speaker.

Additionally, a motion sensor that uses a mechanism of sensing ultrasonic reflection may be realized as the speaker 2, on which directivity control can be performed. For example, the speaker 2 may be used as a so-called parametric speaker of modulating sounds (warning sounds) with a frequency beyond the audible band by using characteristics of ultrasonic waves that straightly and nonlinearly travel, and of outputting the modulated sounds at high sound pressure to realize super-directivity within the audible band.

In this way, the car 1 can keep on outputting warning sounds from the speaker 2 to a warning target present in a range of the audible band during driven. The speaker 2 may output warning sounds by using super-directivity within the audible band constantly/intermittently, on the basis of time setting such as night, or at given timing of a user.

In addition to a straight direction, a direction of super-directivity of the speaker 2 within the audible band can be changed in accordance with manipulation of blinkers. A direction of super-directivity of the speaker 2 within the audible band may also be changed over time so as to scan the perimeter. A direction of super-directivity of the speaker 2 may be changed by the speaker array or the motor drive.

The speaker control unit 20 may decrease a sound volume of warning sounds that are output from the speaker 2 below a predetermined sound volume if the area in front of the car is illuminated by the headlight function of the illumination unit 3. The speaker control unit 20 may also gradually increase a sound volume of warning sounds that are output from the speaker 2 as a warning target becomes closer.

In describing illumination unit control, it has also been described that the area in the traveling direction is illuminated by the headlight function of the illumination unit 3 in the driving mode. However, illumination unit control according to the present embodiment is not limited thereto. For example, the illumination unit 3 may perform a projection operation on a warning target in the driving mode. In this case, the illumination unit 3 may have not only the light outlet 3a from which light illuminating the area in the traveling direction goes out, but also a further light outlet from which light is projected on the warning target recognized by the warning target recognition unit 19.

If a waning target is recognized by the warning target recognition unit 19 in the driving mode, the illumination unit 3 may perform a warning operation by blinking light that illuminates the area in the traveling direction.

Additionally, the present technology may also be configured as below:

(1) A mobile object including:
an imaging unit configured to capture a perimeter of the mobile object;
a speaker configured to be capable of controlling directivity;
a determination unit configured to determine whether the mobile object is in a driving mode; and
a speaker control unit configured to control the speaker in the driving mode in a manner that predetermined audio is output toward a warning target that is recognized based on a captured image captured by the imaging unit, and to control the speaker in a non-driving mode in a manner that the predetermined audio is output in a non-directional way.

(2) The mobile object according to (1), further including:
a headlight having a projector function; and
a reproduction control unit configured to reproduce input content data,
wherein the reproduction control unit performs reproduction control in the non-driving mode in a manner that the projector function of the headlight having the projector function is used to project a video, and performs reproduction control in a manner that audio is output from the speaker in a non-directional way.

(3) The mobile object according to (2), wherein the reproduction control unit controls, in the non-driving mode, projection using the projector function of the headlight having the projector function in accordance with a position of a person detected from the captured image captured by the imaging unit.

(4) The mobile object according to (3),
wherein the headlight having the projector function includes a physical mechanism that changes a projection direction, and
wherein the reproduction control unit controls the projection direction in accordance with the position of the person.

(5) The mobile object according to any one of (2) to (4), wherein the reproduction control unit controls a shape of a video that is projected, through signal processing, based on the captured image captured by the imaging unit.

(6) The mobile object according to any one of (2) to (5), wherein the reproduction control unit controls color information of a video that is projected, on the basis of the captured image captured by the imaging unit.

(7) The mobile object according to any one of (2) to (6), wherein the headlight having the projector function causes a headlight unit to emit light in the driving mode, and causes a projector unit to perform a projection operation in the non-driving mode.

(8) The mobile object according to any one of (2) to (6), wherein the headlight having the projector function causes a projector unit to project a video for projecting white light in the driving mode, and causes the projector unit to project a content video in the non-driving mode.

(9) The mobile object according to any one of (1) to (8), further including: a warning target recognition unit configured to recognize, in accordance with a distance between a person detected from the captured image captured by the imaging unit and the mobile object, and in accordance with relative speed of the person and the mobile object, the person as the warning target in the driving mode.

(10) The mobile object according to any one of (1) to (9), wherein the speaker control unit controls, in the non-driving mode, a position for localizing a sound image of audio output from the speaker, in accordance with a position of a person detected from the captured image captured by the imaging unit.

(11) The mobile object according to any one of (1) to (10), wherein the determination unit determines, based on at least one of an odometer value, a vibration measurement value, position information, and a driving sound measurement value, whether the mobile object is in the driving mode.

(12) The mobile object according to any one of (1) to (11), wherein the speaker control unit controls, in the driving mode, the speaker to output a warning sound toward the warning target recognized based on the captured image captured by the imaging unit.

(13) A non-transitory computer-readable storage medium having a program stored therein, the program causing a computer to function as:
an imaging unit configured to capture a perimeter of a mobile object;
a speaker configured to be capable of controlling directivity;
a determination unit configured to determine whether the mobile object is in a driving mode; and
a speaker control unit configured to control the speaker in the driving mode in a manner that predetermined audio is output toward a warning target that is recognized based on a captured image captured by the imaging unit, and to control the speaker in a non-driving mode in a manner that the predetermined audio is output in a non-directional way.

The present disclosure contains subject matter related to that disclosed in Japanese Priority Patent Application JP 2012-208028 filed in the Japan Patent Office on Sep. 21, 2012, the entire content of which is hereby incorporated by reference.

What is claimed is:

1. A vehicle, comprising:
a detection unit configured to detect a target person;
a projector configured to project at least one of an image or a video on a surface outside the vehicle; and
a circuit configured to:
determine a driving status of the vehicle is one of moving, braking, or stopped;
control, based on the determination that the driving status of the vehicle is one of braking or stopped, the projector to project the at least one of the image or the video in a first direction;
detect a position of the target person based on the detection by the detection unit; and
control, based on the detected position of the target person, the projector to change the first direction of the projection of the at least one of the image or the video to a second direction towards the surface outside the vehicle, wherein the at least one of the image or the video projected in the second direction is viewable on the surface outside the vehicle.

2. The vehicle according to claim 1, wherein the circuit is further configured to determine the driving status of the vehicle is one of moving, braking, or stopped, based on at least one of an odometer value, a vibration measurement value, position information, or a driving sound measurement value.

3. The vehicle according to claim 1, wherein the circuit is further configured to control the projector to project the at least one of the image or the video on the surface by reproduction of input content data.

4. The vehicle according to claim 1, wherein the circuit is further configured to control a shape of the projected at least one of the image or the video, based on the detected position of the target person.

5. The vehicle according to claim 1, wherein the projector includes a physical mechanism configured to change the first direction of the projection of the at least one of the image or the video to the second direction towards the surface outside the vehicle.

6. The vehicle according to claim 1, wherein the circuit is further configured to recognize the target person as a warning target, based on:
a distance between the target person detected by the detection unit and the vehicle, and
a relative speed of the target person with respect to the vehicle.

7. The vehicle according to claim 1, wherein the circuit is further configured to control color information of the projected at least one of the image or the video.

8. The vehicle according to claim 1, further comprising a speaker configured to output a warning sound to warn the target person, wherein the circuit is further configured to control, based on the detected position of the target person, the speaker to change a directivity of the warning sound.

9. The vehicle according to claim 1, wherein
the projector is a headlight of the vehicle, and
the circuit is further configured to control the projector to switch between the headlight and the projector.

10. A non-transitory computer-readable medium having stored thereon computer-executable instructions that, when executed by a processor, cause the processor to execute operations, the operations comprising:
controlling a detection unit of a vehicle for detecting a target person;
determining a driving status of the vehicle is one of moving, braking, or stopped;
controlling, based on the determination that the driving status of the vehicle is one of braking or stopped, a projector of the vehicle for projecting at least one of an image or a video in a first direction, wherein the projector is configured to project the at least one of the image or the video on a surface outside the vehicle;
detecting a position of the target person based on the detection of the target person; and
controlling, based on the detected position of the target person, the projector to change the first direction of the projection of the at least one of the image or the video to a second direction towards the surface outside the vehicle, wherein the at least one of the image or the video projected in the second direction is viewable on the surface outside the vehicle.

11. An information processing apparatus, comprising:
at least one processor configured to:
determine a driving status of a vehicle is one of moving, braking, or stopped;
control, based on the determination that the driving status of the vehicle is one of braking or stopped, a projector to project at least one of an image or a video in a first direction, wherein the projector is configured to project the at least one of the image or the video on a surface outside the vehicle; and
control, based on a detected position of a target person, the projector to change the first direction of the projection of the at least one of the image or the video to a second direction towards the surface outside the vehicle, wherein the at least one of the image or the video projected in the second direction is viewable on the surface outside the vehicle.

12. The information processing apparatus according to claim 11, wherein the at least one processor is further configured to:
control a speaker to output a warning sound to warn the target person;
decrease a sound volume of the warning sound below a threshold sound volume in case an area in front of the vehicle is illuminated by the projector; and
gradually increase the sound volume of the warning sound as the vehicle comes closer to the target person.

13. The information processing apparatus according to claim 11, wherein the at least one processor is further configured to execute a warning operation by a blinking light that illuminates an area in a traveling direction of the vehicle.

14. An information processing method, comprising:
determining a driving status of a vehicle is one of moving, braking, or stopped;
controlling, based on the determination that the driving status of the vehicle is one of braking or stopped, a projector to project at least one of an image or a video in a first direction, wherein
the projector is attached to the vehicle, and
the projector is configured to project the at least one of the image or the video on a surface outside the vehicle; and
controlling, based on a detected position of a target person, the projector to change the first direction of the projection of the at least one of the image or the video to a second direction towards the surface outside the vehicle, wherein the at least one of the image or the video projected in the second direction is viewable on the surface outside the vehicle.

15. A non-transitory computer-readable medium having stored thereon computer-executable instructions that, when executed by a processor, cause the processor to execute operations, the operations comprising:
determining a driving status of a vehicle is one of moving, braking, or stopped;
controlling, based on the determination that the driving status of the vehicle is one of braking or stopped, a projector to project at least one of an image or a video in a first direction, wherein the projector is configured to project the at least one of the image or the video on a surface outside the vehicle; and
controlling, based on a detected position of a target person, the projector to change the first direction of the projection of the at least one of the image or the video to a second direction towards the surface outside the vehicle, wherein the at least one of the image or the video projected in the second direction is viewable on the surface outside the vehicle.

* * * * *